(12) United States Patent
Shtukater

(10) Patent No.: US 11,099,405 B2
(45) Date of Patent: Aug. 24, 2021

(54) MASTER SLAVE SMART CONTACT LENS SYSTEM

(71) Applicant: Aleksandr Shtukater, Fair Lawn, NJ (US)

(72) Inventor: Aleksandr Shtukater, Fair Lawn, NJ (US)

(73) Assignee: Raayon Nova LLC, Fair Lawn, NJ (US)

( * ) Notice: Subject to any disclaimer, the term of this patent is extended or adjusted under 35 U.S.C. 154(b) by 228 days.

(21) Appl. No.: 15/268,582

(22) Filed: Sep. 17, 2016

(65) Prior Publication Data

US 2018/0224669 A1    Aug. 9, 2018

(51) Int. Cl.
G02C 7/04         (2006.01)
G06F 13/12        (2006.01)
G02C 11/00        (2006.01)

(52) U.S. Cl.
CPC ............. *G02C 7/04* (2013.01); *G02C 11/10* (2013.01); *G06F 13/124* (2013.01); *Y02D 10/00* (2018.01)

(58) Field of Classification Search
CPC ........................................................ G02C 7/04
See application file for complete search history.

(56) References Cited

U.S. PATENT DOCUMENTS

| | | | |
|---|---|---|---|
| 6,447,449 B1 | 9/2002 | Fleischman et al. | |
| 6,579,235 B1 | 6/2003 | Abita et al. | |
| 6,749,568 B2 | 6/2004 | Fleischman et al. | |
| 7,169,106 B2 | 1/2007 | Fleischman et al. | |
| 7,639,845 B2 | 12/2009 | Utsunomiya | |
| 8,241,574 B2 | 8/2012 | Burles et al. | |
| 8,336,387 B2 | 12/2012 | Tai et al. | |
| 8,385,998 B2 | 2/2013 | Zhang et al. | |
| 8,857,981 B2 | 10/2014 | Pletcher et al. | |
| 8,864,305 B2 | 10/2014 | Pletcher et al. | |
| 8,870,370 B1 | 10/2014 | Otis et al. | |
| 8,960,898 B1 | 2/2015 | Etzkorn et al. | |
| 8,960,899 B2 | 2/2015 | Etzkorn | |
| 8,965,478 B2 | 2/2015 | Liu | |
| 8,971,978 B2 | 3/2015 | Ho et al. | |

(Continued)

OTHER PUBLICATIONS

U.S. Appl. No. 13/780,135, filed Aug. 28, 2008, Blum Ronald D.

*Primary Examiner* — Hsinchun Liao

(57) ABSTRACT

A smart contact lens system and corresponding method for system control and exchanging data and commands between the two components has been disclosed. The system establishes a Master-Slave operational relationship between constituent components. Master-Slave relationship can exist between the two contact lenses, where one lens is a master while the other is a slave or between an external device which may serve as the master component and the contact lenses which may serve as the slave component. The system also comprises a smart contact lens substrate with an embedded communication module and a power supply module. The method to facilitate system control as well as data and commands exchange includes detecting the active system components, dynamically bonding and pairing the detected active components, dynamically or statically categorizing one of the component as master and the other one as slave and exchanging information and commands between the components.

20 Claims, 5 Drawing Sheets

(56) References Cited

U.S. PATENT DOCUMENTS

| | | |
|---|---|---|
| 8,979,271 B2 | 3/2015 | Pletcher et al. |
| 8,985,763 B1 | 3/2015 | Etzkorn et al. |
| 8,986,240 B2 | 3/2015 | Dos Santos et al. |
| 8,989,834 B2 | 3/2015 | Ho et al. |
| 9,047,512 B2 | 6/2015 | Otis et al. |
| 9,054,079 B2 | 6/2015 | Etzkorn |
| 9,055,902 B2 | 6/2015 | Liu |
| 9,063,351 B1 | 6/2015 | Ho et al. |
| 9,111,473 B1 | 8/2015 | Ho et al. |
| 9,113,829 B2 | 8/2015 | Etzkorn |
| 9,125,721 B2 | 9/2015 | Field |
| 9,155,653 B2 | 10/2015 | Field |
| 9,158,133 B1 | 10/2015 | Pletcher et al. |
| 9,161,712 B2 | 10/2015 | Etzkorn |
| 9,176,332 B1 | 11/2015 | Etzkorn et al. |
| 9,184,698 B1 | 11/2015 | Wiser et al. |
| 10,600,507 B2 * | 3/2020 | Bostick .................. G16H 50/70 |
| 2004/0027536 A1 | 2/2004 | Blum et al. |
| 2006/0173497 A1 | 8/2006 | Mech |
| 2008/0208335 A1 | 8/2008 | Blum |
| 2010/0113901 A1 | 5/2010 | Zhang |
| 2015/0261294 A1 * | 9/2015 | Urbach ................... G06F 3/013 345/156 |
| 2016/0097940 A1 * | 4/2016 | Sako .................. H04N 5/23293 351/158 |
| 2018/0078360 A1 * | 3/2018 | Hyde .................... A61F 2/1624 |

\* cited by examiner

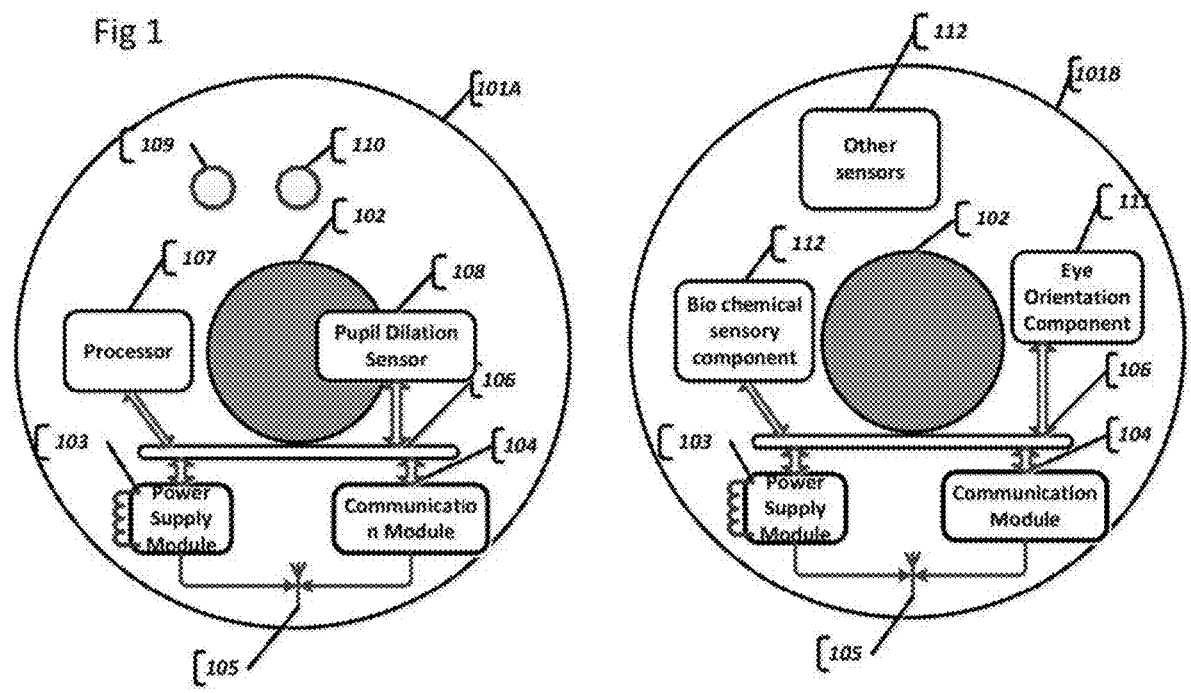

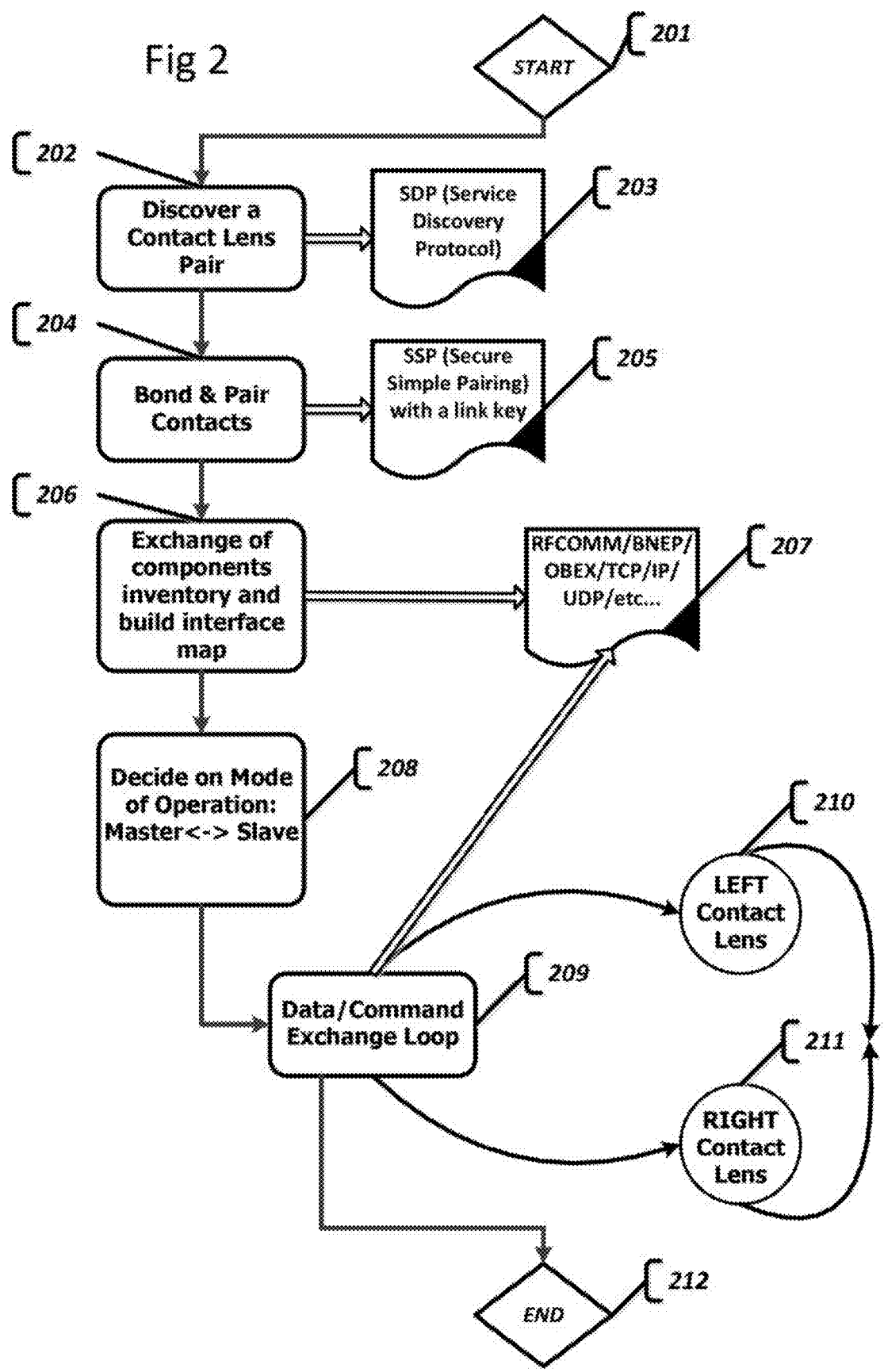

Device Interface Map 1 on 101A lens representing paired 101B lens

| Index | Name | Address | Device Id |
|---|---|---|---|
| 1 | Display | 1.15.10 | 100 |
| 2 | Eye Orientation component | 1.15.20 | 101 |
| 3 | Bio Chemical component | 1.15.30 | 102 |
| 4 | Other sensors | 1.15.40 | 103 |
| 5 | Communication component | 1.15.50 | 104 |

302

Device Interface Map 2 on 101B lens representing 101A lens

| Index | Name | Address | Device Id |
|---|---|---|---|
| 1 | Display | 1.16.10 | 200 |
| 2 | Pupil Dilation component | 1.16.20 | 201 |
| 3 | Image Capture component | 1.16.30 | 202 |
| 4 | Depth Capture component | 1.16.40 | 203 |
| 5 | Communication component | 1.16.50 | 204 |

303

Services Interface Map 1 on 101A lens representing paired 101B lens

| Index | Service Name | Address | Service Id |
|---|---|---|---|
| 1 | Output Info to Display | 1.17.10 | 1000 |
| 2 | Fetch Eye Orientation | 1.17.20 | 1001 |
| 3 | Fetch Bio Chemistry | 1.17.30 | 1002 |

304

Services Interface Map 2 on 101B lens representing 101A lens

| Index | Service Name | Address | Service Id |
|---|---|---|---|
| 1 | Output Info to Display | 1.18.10 | 2000 |
| 2 | Fetch Pupil Dilation | 1.18.20 | 2001 |
| 3 | Fetch Color Image | 1.18.30 | 2002 |
| 4 | Fetch Depth Image | 1.18.40 | 2003 |

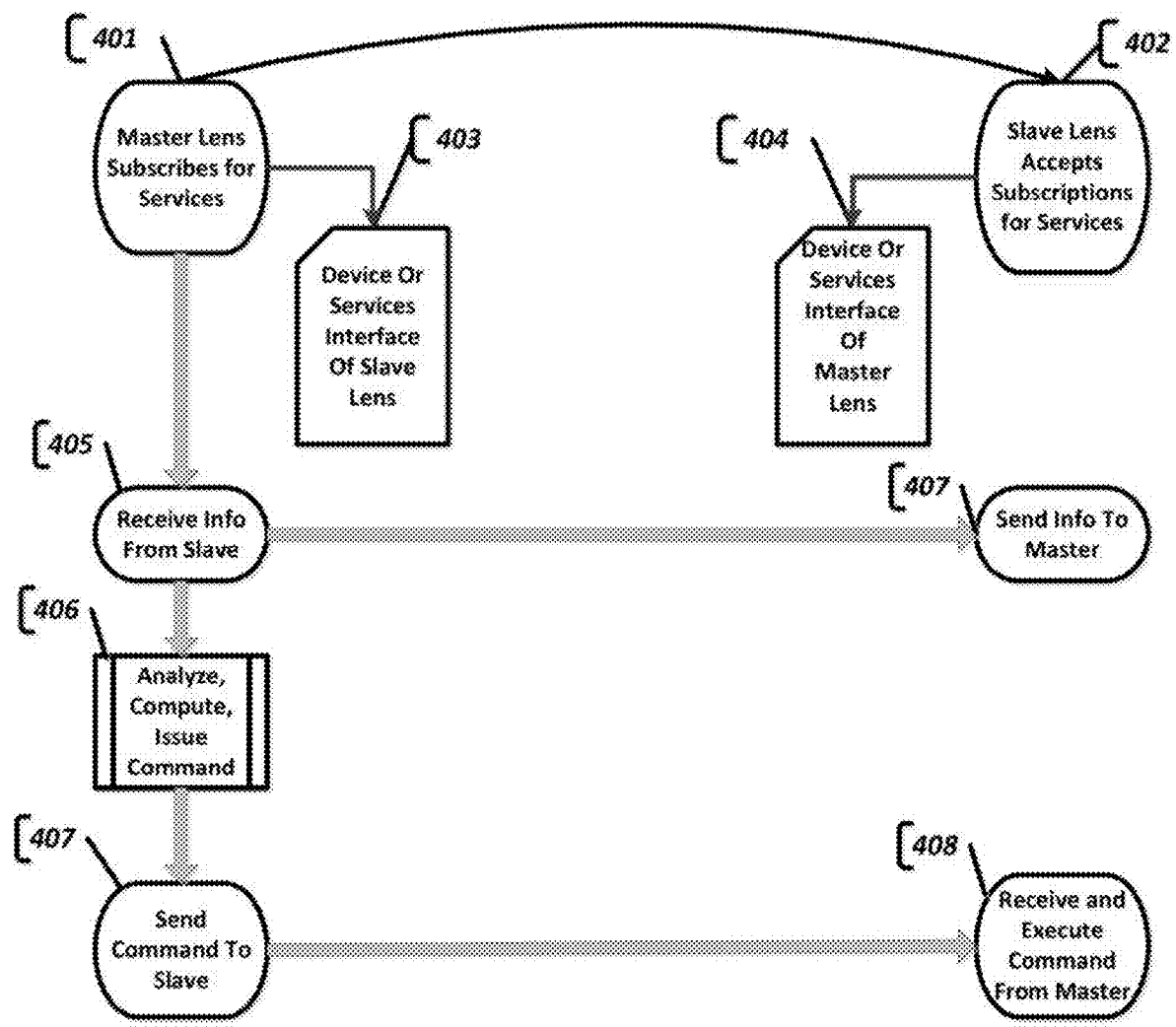

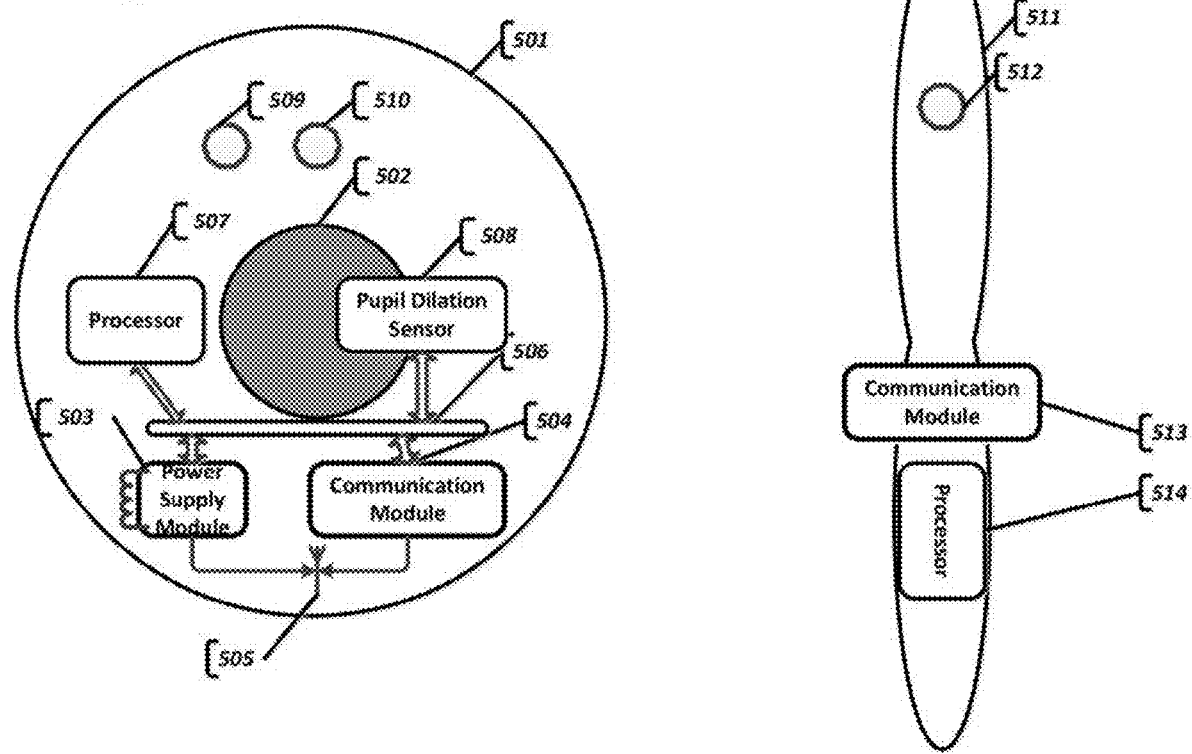

MASTER SLAVE SMART CONTACT LENS SYSTEM

TECHNICAL FIELD OF INVENTION

The invention relates to a smart contact lens (SCL) system with heterogeneous contact lenses wherein master slave relationship is established between the lenses or lens and external controlling unit. The Master Slave system comprising various electronic or electro-optical or optical components and sensors.

BACKGROUND OF THE INVENTION

There are two primary limitations of using any embedded electronic or electro-optical or optical components within the contact lens. First limitation is the amount of space available on the contact lens and the second limitation is the amount of electric power needed to power variety of electronic or electro-optical components to enable the smart contact lens operations. To build a versatile, multifunctional smart contact lens system, the contacts need to integrate variety of electronic, electro or electro-optical components that include variety of sensors and controllers of varying size. In some embodiments, there is a need for plurality of components of the same type to be instantiated on the contact lens. For example, as per Google's U.S. Pat. No. 8,857,981, plurality of homogeneous capacitance sensors, disposed around the edges of the contact lens may be used to detect eye blinks. In some cases, only one sensor may be used, while in some cases plurality of instances of the same sensor may be used on the contact lens. Moreover, the center of the contact lens, that is the space immediately in front of the pupil of the eye cannot be used for accommodating any non-transparent component(s) to enable clear visual perception. Use of smaller electronic components, such as micro or better nano scale components may partly alleviate the issue however may not completely solve it. Furthermore, each electronic or electro-optical or optical component used in the lens consumes electric power. Plurality of varying sensors, controller(s), memory storing, data processing and communication supporting electronic components significantly escalate the need for electric power to make the lens function properly.

Similarly, to overcome the aforesaid problems, the disclosed smart contact lens system may also incorporate one or two smart contact lens and certain off the eye controlling device, optimally positioned on the head or user's nose in close proximity of the contact lens. However, arranging single smart contact lens with data processing and SCL controlling processing capability and fitting it with multiple sensors is not an easy task. Therefore, there is a dire need for an innovative system that solves or alleviates afore mentioned limitations.

SUMMARY OF THE INVENTION

The present invention seeks to alleviate these problems by providing a system of integrated heterogeneous contact lenses functioning together in a master-slave pattern. The invention alleviates the need to cramp all electronic components integral for the functioning of the system into one contact lens. Because of the natural binary and synchronous nature of the eyes' function, the measurements from one contact lens can be applied to the other and thus doing away with the need to have one universal lens with a plurality of components and drastically reducing the power consumption by differing embedded components on the same lens.

In the one non limiting, exemplary embodiment, contact lens system comprised of a couple of contact lenses with one lens for the right eye and other for the left eye. Albeit each contact lens incorporates differing sets of electronic and electro-optical, optical components, each contact lens may also integrate the same components. For instance, an embedded transparent display and display controller as well as communication and electric supply modules. At the same time, first contact lens may, for example, incorporate certain components and the second contact lens may instead incorporate certain other components. For example first contact lens may incorporate the set of orientation sensors, GPS sensor and processor module. Second contact lens may, for example, instead incorporate image capture device, range measuring device as well as rear oriented pupil dilation sensor.

In humans, variety of eye functions are coupled and are naturally synchronized between the eyes. For example eye movement during vergence either causes movement of both the eyes either towards each other or away from each other. Both eyes, focus and accommodate to the same degree. Pupil's response to various stimuli is mostly the same. Both healthy human eyes have similar tear fluid production both in terms of chemistry and volume. Given the homogeneity and synchronicity of the eyes' operation, by measuring any given parameter in one eye, same parameter concerning another eye can be extrapolated and generalized. This allows the contact lens system to measure any given parameter on the first eye and then project the strength of the expression of the parameter for the corresponding second eye based on the reading in the first eye.

The entire system is operable with one controlling component, where one contact lens may be selected to be the controller (Master) of the second device (Slave) contact lens.

In another embodiment, we propound, an arrangement of the smart contact lens system, that incorporates at least one SCL and off the eye, possibly head or nose mounted controlling component. Where SCL may be selected as Slave component and head mounted component may act as Master Component or vice versa.

Master component contains processing module that may function as a controller for the entire system and the specific device where the processor module is incorporated. Whereas, Slave component, may not have processing module enabled to control the operations of the entire system, on the other hand Slave may contain MCUs, controllers to control specific integrated devices and sensors.

For the purposes of present disclosure, Slave component denotes slave contact lens and Master component denotes In one exemplary, non-limiting embodiment, Slave component exposes and provides access to Master component to its services and sub-devices (embedded sensors/devices).

In one exemplary, non-limiting embodiment, Master component may expose and provide access to Slave component to its services and sub-devices (embedded sensors/devices).

In one exemplary, non-limiting embodiment, Master component exercises control over the operation and functioning of the entire system, additionally, Master component may exercise control over certain aspects of the operation and functioning of the Slave component.

In some embodiments, the smart contact lens system may incorporate one or two smart contact lenses and certain off the eye controlling device, optimally positioned on the head or user's nose or ears in close proximity of the contact lens.

BRIEF DESCRIPTION OF THE DRAWINGS

The drawings, in which like numerals represent similar parts, illustrate generally, by way of example, but not by way of limitation, various embodiments discussed in the present document.

FIG. 1 is a component view of the two smart contact lens representing one system.

FIG. 2 is a process flow diagram according to an embodiment, describing the work flow between the two contact lenses connected by a communication channel.

FIG. 3 depicts service and device interfaces exposed by each constituent system component according to an embodiment.

FIG. 4 component and flow diagram depicting the Master-Slave system, involving at least one contact lens, according to an embodiment.

FIG. 5 depicts component diagram of a Master-Slave contact lens system incorporating at least one contact lens and an off the eye component according to an embodiment.

DETAILED DESCRIPTION

Having described the main features of the invention above, a brief and non-limiting description of a preferred embodiment will be given in the following paragraphs with reference to the accompanying drawings.

In all the figures, like reference numerals represent like features. Further, the shape, size and number of the devices shown are by way of example only and it is within the scope of the present invention to change their shape, size and number without departing from the basic principle of the invention.

All through the specification, the technical terms and abbreviations are to be interpreted in the broadest sense of the respective terms, and include all similar items in the field known by other terms, as may be clear to persons skilled in art. Restriction or limitation if any referred to in the specification, is solely by way of example and understanding the present invention. For the purposes of present disclosure, term Slave component may refer to a smart contact lens. For the purposes of present disclosure, term Slave component may refer to an off the eye device forming part of the smart contact lens system. For the purposes of present disclosure, term Master component may refer to a smart contact lens. For the purposes of present disclosure, term Master component may refer to an off the eye device forming part of the smart contact lens system.

In one non-limiting, exemplary embodiment, the two contact lenses used may be structurally heterogeneous, whereas, first contact lens is arranged with certain component(s) that do not appear on the second contact lens and second lens is arranged with certain component(s) that do not appear on the first contact lens.

The system, comprising the two heterogeneous contact lenses may be coupled in a Master Slave configuration. Whereas, one contact lens, comprising processing module, negotiates and establishes control for certain aspects of the complete system's function. The (Master) controlling contact lens may optionally regulate and control the certain functions of the subordinate contact lens (The Slave).

In one non-limiting, exemplary embodiment, the contact lens system comprises a pair of heterogeneous contact lenses. The contact lens system may be arranged in a master/slave relationship. Namely, the two constituent contact lenses are embedded with different variety of sensors. To make the two contact lenses share the information and services between each other and to enable the two contact lenses to work together, one of the two contact lens selected to be the primary or the master. Preferably, the contact lens that carries processor module and is arranged to receive communication signals from the secondary contact lens is known as the master contact lens. The contact lens that is arranged with communication module and is receiving commands from the primary contact lens is known as slave contact lens.

In one non-limiting, exemplary embodiment, the contact lens system, as per FIG. 1, comprises left contact lens 101A and right contact lens 101B. The two contact lens are heterogeneous because of their deferring electronic or electro-optical components. An integrated component 102 is a transparent or semi-transparent display or non-transparent. The integrated display 102 may optionally be coupled with Fresnel lens. In one non-limiting, exemplary embodiment, an integrated display 102 may comprise pixel matrix whereas each pixel or arbitrary small group of pixels have separate micro lens projecting collimated or nearly collimated beam of light directly onto the surface of the retina of the eye. In both cases the central parts of the image registered by the retina is in focus. The contact lens includes an onboard power supply module 103.

Power supply module may power the entire contact lens and all of its subsystems. In one non-limiting embodiment, power supply may comprise integrated onboard battery or accumulator or capacitor. In one non-limiting embodiment, power supply module 103 may derive electric power from an RF energy transfer antenna 105. Antenna 105 may generate its power from RF power source, located nearby. For example, subject may carry RF energy radiator on his/her glasses or nose or ear based set. In one non-limiting embodiment, the same RF radiator may serve as correspondent communication transceiver and for the communication module 104. Communication module may be arranged with RF or Bluetooth or WIFI transceiver or with transceiver supporting any other protocol and method of data transmission. In one non-limiting exemplary embodiment, communication may be achieved with an optical light emitter and light detector hardware, where data flows in the form of light. Power supply module 103 may also receive electricity from an integrated into the contact lens substrate, miniaturized solar panel. Power supply module 103 may also receive electricity from an integrated into the contact lens substrate, piezoelectric sensor or piezoelectric electricity generator that generate electric charge in response to movement. Contact lens has an embedded, integrated electric circuitry 106 that connects various components of the system with one another and also electro-wires the components providing power to active contact lens. The said electric circuitry also delivers electric power to the components of the system.

In one non-limiting, exemplary embodiment, left contact lens may also comprise processing component 107. Processing component may be implemented as electronic chip of micro or nano scale, capable of processing computer instructions and it may comprise an onboard memory. The microprocessor may be connected to a communication bus 106. The microprocessor may be implemented as MCU, CPU, GPU, HPU or any other processing or controller unit.

In one non-limiting, exemplary embodiment, left contact lens 101A may also comprise pupil dilation sensor 108 arranged to determine the level of dilation.

In one non-limiting, exemplary embodiment, left contact lens 101A may also comprise image capture device 109 that may be implemented with miniaturized CCD or CMOS sensor. Image capture device may be electronically coupled with the processor 107 or communication bus 106 or both. Image capture device may be configured to capture a single image at a time or take video recording. The contact lens 101A may be configured to wirelessly transmit image data from image capture device 109 in real-time or in pre-recorded mode. Furthermore, the contact lens 101A may be configured to process images captured by component 109 in processor 107 for image recognition and image analysis.

In one non-limiting, exemplary embodiment, left contact lens 101A may comprise depth image capture component 110. Depth capture component may be implemented as monochrome CMOS sensor optionally coupled with IR emitter. Depth image capture component may be implemented as a range finder or LIDAR or as one of the variety of other depth or distance measuring methods.

In one non-limiting, exemplary embodiment, right contact lens 101B comprises the generic components such as, non-transparent, semi-transparent or transparent display module 102, power supply module 103, communication module 104 with energy transfer or communication antenna module 105 as well as communication bus 106.

Furthermore, in one non-limiting, exemplary embodiment, right contact lens 101B may incorporate bio chemical sensory component 112 with plurality of bio chemical sensors measuring health related parameters for the contacts wearer. Additionally, the contact lens may include the eye orientation module component 111 arranged to determine the vector of eye's gaze and any other sensors 112.

Each contact lens may comprise variety of controllers MCU controllers, for example display control sub-system, which regulates the disposition of an image is output to the contact lens.

It should be understood that above described contact lens arrangement is exemplary and in no way limiting to the scope of the invention.

FIG. 2 describes the work flow of the of the two contact lenses consisting of the steps of discovering, pairing, bonding, and dynamically configuring to form an operational two contact lens based system and operation of such a system. The process starts at step 201, at this step the at least one, contact lens may be turned on, to an active state with variety of methods. For example, RF energy radiator is brought near the contact lens and contact lens starts generating electrical power that activates it. In one non-limiting, exemplary embodiment, activation signal may be sent wirelessly when the lens is powered or through any other suitable means.

In one non-limiting, exemplary embodiment, contact lens may be activated by delivering targeted ray of light onto the contact lens light sensor.

For the purposes of the demonstration we will assume that the contact lens system uses Bluetooth stack of protocols for communication establishment and communication. However, it should be understood that communication may be implemented with any communication protocol or mechanism based on any communication frequency band or communication protocol, combination of protocols or standards. The Bluetooth is used hereby only in an exemplary fashion. There is discovery phase, pairing phase and communication phase. The Bluetooth standard has well established suite of protocols supporting device to device communication. The Bluetooth standard v4.2, released on December 2014, or higher versions introduce number of enhancements geared towards IoT (Internet of Things) and therefore, is ideally suited to support communication channel between the two contact lens.

In one non-limiting, exemplary embodiment, at step 202 the system is placed into discovery mode. The contact lens utilizes the Service Discovery Protocol (SDP) protocol 203 to detect available counter contact lens. Service discovery Protocol detects Bluetooth profiles supported by the device, protocol multiplexer settings required to connect to correspondent device. Each service is identified by a UUID (Universally Unique Identifier). At step 202 each contact lens searches and discovers its counterpart which for the purposes of present disclosure is also known as pair or counter lens.

In one non-limiting, exemplary embodiment, once the counterparty contact lens is detected, at step 204 the system bonds and pairs two devices, thereby forming one system. Bonding and pairing may be achieved using SSP (Secure Simple Pairing) protocol with a link key 205.

In discoverable mode Bluetooth protocol enabled devices, on demand, generally transmit the following information:
Device name
Device class
List of services
Technical information (for example: device features, manufacturer, Bluetooth specification used, clock offset)

This information may be used by paired contact lens to set up profile of the paired device. One device can request the information by invoking for example a 48 bit address of the counterparty and counterparty normally responds with the profile information. The counterparty profiling may be pre-configured or may be performed dynamically at the time of pairing or establishing connection.

In one non-limiting, exemplary embodiment, the contact lens set may comprise more than two contact lens. Where each lens may have specialized function and depending on the need and may be substituted and swapped for another contact lens that is part of the set.

In one non-limiting, exemplary embodiment, once the two contacts are paired, the two contacts exchange inventory of embedded devices at step 206. The exchange is made with one of many protocols available in Bluetooth suite of protocols 207. For example, with OBEX (Object Exchange) protocol, that facilitates binary object exchange between devices. Alternatively, RFCOMM, BNET, TCP, UDP protocols may be used to transfer an inventory of embedded devices. Any other communication protocol may be used, for example, TCP/IP protocol to transfer the inventory listing.

Step 206 may be dynamically initiated with a request from a counter contact lens or the contact lens may be configured to send inventory as the first message after pairing and establishment of connection. The inventory listing may comprise information about the version of the contact lens, listing of integrated devices, sensors, their IDs, device addressing keys and specifications any other information.

In one non-limiting, exemplary embodiment, each contact lens builds its pair's device/service interface map from the information obtained at step 206 during component inventory exchange. The device and service interface map for the paired contact lens will contain all information needed by the first contact lens to make use of services and devices on the second contact lens.

At step 208, the contact lens system as a whole, decides on modus operandi (mode of operation) of each component involved.

In one non-limiting, exemplary embodiment, at step 208, the system dynamically makes a decision regarding selection of either of the two paired contact lenses to function as a Master device and thus the other contact lens serves as Slave device. The decision may be required when two contact lenses paired are both capable of the Master role or only one contact lens is capable of acting as Master device. The decision is made according to preconfigured rules and preferences with respect to interface of services and devices in each of the lenses.

In one non-limiting, exemplary embodiment, at step 208, the system determines which of the two paired contact lenses functions as Master and the other contact lens as Slave device. The contact lenses may be statically configured for appropriate Master or Slave role. The set of contact lens may contain one or more Master contact lens and multiple Slave contact lenses.

Once contact lenses are paired and Master lens is determined, the data and command exchange begins at step 209.

In one non-limiting, exemplary embodiment, operation of the contact lenses assumes bidirectional data and commands flow.

In one non-limiting, exemplary embodiment, operation of the contact lenses assumes bidirectional data and one directional command flow, where commands are issued by the Master device and flow to the Slave device.

In one non-limiting, exemplary embodiment, operation of the contact lenses assumes mono-directional data and command flow. Whereas, commands flow from Master to Slave devices and data flows back to Master from Slave device.

The data and commands flow between left contact lens 210 and right contact lens 211.

The data and command exchange loop stops at step 212, with the entire system going offline. For example, by turning off source of RF radiation that generates power on contact lens. Multiple other ways are there to turn off the system of two contact lenses.

In one non-limiting, exemplary embodiment, the data and command exchange loop may be achieved with for example Bluetooth BR/EDR sub protocol—establishes a relatively short-range, continuous wireless connection, which makes it ideal for use cases such as streaming audio.

In one non-limiting, exemplary embodiment, the data and command exchange loop may be achieved with for example, bluetooth LE, allows for short bursts of long-range radio connection, making it ideal for Internet of Things (IoT) applications that don't require continuous connection but depend on long battery life.

In one non-limiting, exemplary embodiment, the data and command exchange loop may be achieved with for example,—dual-mode chipsets are available to support single devices such as smartphones or tablets that need to connect to both BR/EDR devices (such as audio headsets) and LE devices (such as wearable or retail beacons).

In one non-limiting, exemplary embodiment, as per FIG. 3, table 301 depicts device interface map formed on 101A left contact lens at step 206, and describes exposed devices/sensors from right contact lens 101B. Table 302 depicts device interface map formed on 101B right contact lens at step 206, and describes exposed devices/sensors from the left contact lens 101A.

In one non-limiting, exemplary embodiment, address of the device may be a 48 bit address. Furthermore, the system may also, optionally build services interface map exposed by each lens.

Table 303 depicts services interface map formed on 101B lens representing 101A lens services.

Table 304 depicts services interface map formed on 101A lens representing 101B lens services.

In one non-limiting, exemplary embodiment, the two contact lenses may socialize either directly by invoking device addresses or may utilize services or may utilize combination of the two. Namely, once contact lens may address devices on the second contact lens by via device interface or may invoke a service by utilizing service interface.

Device interfacing provides low hardware level access to the paired contact lens and Service interfacing provides higher level access to the paired contact lens. Services exposed, may be modeled as subscription services (publish/subscribe) or query/respond services. Other models may also be utilized.

In one non-limiting, exemplary embodiment, modus operandi is Master-Slave relationship, where first contact lens (Master) establishes control of main operations of the second contact lens (Slave) and hence of the entire paired contact lens system. First contact lens, having a processor module, is established as Master (controlling) device between the two paired contact lenses. The master contact lens comprises a processing module that is configured to execute variety of hardware or software programs. The processing module on the master contact lens requests/subscribes for variety of exposed services from the Slave contact lens. Further, processing module of the Master lens computes and determines actions/commands to be undertaken by the Master and Slave contact lens. Commands are fed directly to the locally disposed, on the Master lens, sub-devices and fed to Slave lens via communication channel.

In one non-limiting, exemplary embodiment, modus operandi of each component may be statically predefined on the level of hardware or by the software.

In one non-limiting, exemplary embodiment, the contact lens system as a whole, may incorporate and comprise sub-components and services that use combination of two modes: some components and services may operate in master-Slave mode between the constituent components of the system and some components and services may operate in a peer to peer mode between the constituent components of the system.

In one non-limiting, exemplary embodiment, one of the controlling functions of the Master lens with processing module may be computing information. The computed information is generated and is output onto an embedded display 102 for both contact lens. Master contact lens's display 102 gets direct fed information from processor via contact lens bus 106 while the Slave contact lens is fed the information to be exhibited on its display 102 device via communication module 104.

In one non-limiting, exemplary embodiment, one of the controlling functions of the Master lens with processing module may be subscribing for the updates from variety of Slave based contact lens sensors. For example, subscribing for orientation changes information from 111 orientation sensor module disposed on the Slave contact lens. Similarly, subscribing for updates in Bio Chemical parameters as tracked by the Bio-Chemical sensory component 112 disposed on Slave contact lens.

In one non-limiting, exemplary embodiment, one of the controlling functions of the Master lens with processing module is to issue commands, events for the Slave contact lens to execute.

In one non-limiting, exemplary embodiment, commands and events may be generated by processing module in response to certain other events such as timer call back. For applications where snapshot activity is required, for example, taking a snapshot photo by onboard image capture sensor, glucose level measurement needs to be taken once every 5 mins and so on . . . .

In one non-limiting, exemplary embodiment, commands and events may be generated by processing module due to the need to procure some information from the other lens.

In one non-limiting, exemplary embodiment, commands and events may be generated by processing module as a result of processing of information.

In one non-limiting, exemplary embodiment, information from the eye orientation module 111 may be used by the processing module to track the eyes' gaze vector and compute the disposition of the information overlaid on the embedded display.

Once the disposition of the information on the display is computed for each eye, the information may be fed to the display 102 on Master lens 101A directly via communication bus 106 and may be fed to the display 102 on the Slave lens via communication module 104 and on receiving side further fetched to the display via communication bus 106 on the Slave contact lens. Slave contact lens, the receptor, receives information via communication channel by means of communication module and further the information is pushed via electronic circuitry to the local display controller. The display controller then outputs the data to the embedded display.

It should be understood, that examples of uses of sensors/devices and services on the Slave and Master devices are provided here by way of example and should not be treated as limiting to the scope of the invention.

FIG. 4, depicts one exemplary embodiment of the present system wherein the master lens subscribes for the services at step 401, and Slave lens accepts subscription for services.

The request for services is based on the Device or Service Interface map 403 available to Master Lens. Slave lens may also, subscribe for services from the Master Lens using its own Device or Services interface 404. At step 405 Master Lens receives information subscribed for from the Slave lens which produces information and sends it 407 to the Master. Furthermore, Master lens, using processor module, performs analysis and computation at step 406 based on the data received in the previous step and may produce a command or request that Master Lens sends at step 407 to Slave Lens 408. The send/receive happens in a loop. Opposite direction for information flow and subscription from Slave to Master Lens is also possible (not shown here).

In one non-limiting, exemplary embodiment, as per FIG. 5, an aspect of present invention is disclosed, a contact lens 501 is coupled with either headset or nose based electronic component 511. Component 511, in one embodiment may be implemented to be wearable over and attachable to the nose of the user. The two components communicate via respective communication modules 504 and 513.

In one non-limiting, exemplary embodiment, wearable component 511, may perform all the heavy lifting processing for the contact lens 501 with its processor 514 and hence may serve as a controlling (Master) element. Contact lens may expose its services and components to the wearable controlling component 511 via any communication channel, utilizing communication protocol, for the sake of example, Bluetooth technology. However, it should be understood that any suitable communication protocol may be utilized.

In one non-limiting, exemplary embodiment, contact lens may optionally incorporate, its own embedded processor 507, onboard pupil dilation sensor 508, an optional embedded display 502. Contact lens may also, incorporate power supply module 503, whereas in one embodiment, power may be derived from an embedded solar panel, or alternatively could be generated from a nearby emitter of electromagnetic energy, such as RF or light. For RF power generation, the contact lens needs RF antenna, for generation of power a contact lens needs light/solar panel.

In one non-limiting, exemplary embodiment, power supply module 503 may incorporate variety of electric energy storage mechanisms, including but not limited to, accumulator, capacitor or battery.

Communication may be accomplished with RF antenna 505 using radio waves or alternatively with light based signals where light may be emitted via communication sub-component 509 disposed on the contact lens. A light reader 512 is disposed on wearable component 511 and it is connected to the communication module 513.

In current exemplary embodiment component 510, depicts an embedded image sensor disposed on the contact lens.

In one non-limiting, exemplary embodiment, communication between components of the contact lens is facilitated by an onboard communication bus 506. Power may also be shared between constituent integrated components via bus 506.

In one non-limiting, exemplary embodiment, the operation of the system presupposes light weight services provided by the contact lens and all the heavy processing and communication with the outside world performed by the external wearable component 511.

In one non-limiting, exemplary embodiment, the system may comprise two Slave contact lens and one off the eye Master controlling device, that may provide control over the entire system, external world connectivity, optionally processing power and optionally source of electric power delivered via RF antenna or as light beam to the contact lens.

It is possible to have a smart contact lens system that can optionally combine number of lenses with varying set of sensors and functionalities and depending on the needs of the user at any given time, a combination of two smart contact lens may be selected depending on what functionality each contact lens is offering. For example, at night time a user may choose to wear one contact lens with built in night vision capability (lens #1) with built in transparent display to enhance low light vision and another contact lens may carry bio sensors and built in miniaturized general purpose MCU to control the operation of an entire system (lens #2). During the day, the user may chose to combine lens #2 and smart contact lens with built in image sensor and an onboard memory. (Lens #3) and so on.

It is to be understood that the all above descriptions and embodiments are intended to be illustrative, and not restrictive. For example, the above-described embodiments (and/or aspects thereof) may be used in combination with each other. In addition, many modifications may be made to adapt a particular situation or material to the teachings of the subject matter disclosed herein without departing from the spirit of the invention and its scope. Many other embodiments will be apparent to those of skill in the art upon reviewing the above description. The scope of the subject matter disclosed herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects.

Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure. This written description uses examples to disclose the various embodiments of the subject-matter disclosed herein, including the best mode, and also to enable any person skilled in the art to practice the various embodiments of the subject matter disclosed herein, including making and using any devices or systems and performing any incorporated methods. The patentable scope of the various embodiments of the subject matter disclosed herein is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed:

1. A master slave smart contact lens system comprising:
   At least two devices where at least one device is arranged to operate as a master and the other as a slave;
   At least one smart contact lens substrate with an embedded communication module, power supply module, wherein said smart contact lens may be arranged as master or slave device;
   At least one counter device, comprising at least an integrated communication module and power supply module wherein the said counter device may be arranged as a slave or a master; and
   At least one device comprises directional orientation module or at least one pupil dilation sensor;
   Wherein, the said directional orientation module is configured to determine directional orientation of the eye and the said pupil dilation sensor is configured to determine level of pupil dilation of the eye; and
   Wherein, at least one device subscribes to the directional orientation or pupil dilation information.

2. The master slave smart contact lens system of claim 1, wherein the said counter device may comprise the second smart contact lens or off the eye counter device.

3. The master slave smart contact lens system of claim 1 further comprising: one slave smart contact lens comprising at least one communication module and a power supply module.

4. The master slave smart contact lens system of claim 1 further comprising: one master smart contact lens comprising at least one communication module, a power supply module and a processing module arranged as a controller for the entire system.

5. The master slave smart contact lens system of claim 1 further comprising: one master smart contact lens comprising at least one communication module and a power supply module.

6. The master slave smart contact lens system of claim 1 further comprising off the eye counter device further comprising at least one integrated communication module and a power supply module wherein the said counter device is arranged as a slave or a master.

7. The master slave smart contact lens system of claim 1 further comprising first and second smart contact lens comprising at least one communication module and a power supply module.

8. The master slave smart contact lens system of claim 6 further comprising an off the eye counter device comprising at least one integrated communication module and power supply module wherein the said counter device is arranged as a master device.

9. The master slave smart contact lens system of claim 1, wherein slave component exposes services and access to an embedded sensor(s) and device(s) to the master controller component, via a communication channel.

10. The master slave smart contact lens system of claim 1 further comprising, a slave component with an embedded communication module and a master component with an embedded communication module and processor module.

11. The master slave smart contact lens system of claim 1 comprising:
    At least two devices where at least one device is arranged to operate as a master and the other as a slave;
    At least one smart contact lens substrate with an embedded communication module, power supply module, wherein the said smart contact lens may be arranged as master or slave device;
    At least one counter device, comprising at least an integrated communication module and power supply module wherein the said counter device may be arranged as a slave or a master; and
    At least one device comprising GPS sensor, configured to determine current location of device.

12. The master slave smart contact lens system of claim 1, further consisting of the said master or the said slave component that is smart contact lens further configured with an embedded display.

13. A method of operating a master slave smart contact lens system, Wherein, the said slave component is arranged to be at least one smart contact lens or an off the eye device, further comprising the steps of:
    Discovering active system components using predefined communication protocol;
    Dynamically bond and pair available active components by establishing communication channel;
    Exchanging components inventory and building interface map for the paired component;
    Dynamically determine which component is master or slave component or use statically predefined configuration of master slave component relationship;
    Exchange information and commands between master and slave components of the system;
    Wherein, the said slave or master component comprises directional orientation module or at least one pupil dilation sensor; and
    Wherein, the directional orientation module is configured to determine directional orientation of the eye and the said pupil dilation sensor is configured to determine level of pupil dilation of the eye.

14. The method as described in claim 13, where master component requests information from and sends commands to the slave component to be executed by the said slave component and the communication channel.

15. The method as described in claim 13, where communication channel is established by communication module of at least one slave component and communication module of the master component.

16. The method as described in claim 13, where master component and slave component each expose their respective devices and services to each other and services requests for data and service to each other via communication channel.

17. The method as described in claim 13, whereas smart contact lens system is further configured in a master slave arrangement, whereas the said system comprises at least two components, whereas each component comprises at least communication module and power supply module, whereas at least one device is a smart contact lens.

18. The method of operating a master slave smart contact lens system of claim 13, Wherein the said slave component is arranged to be at least one smart contact lens and the master component is arranged to be at least one smart contact lens or an off the eye device, further comprising the steps of:

Discovering active system components using predefined communication protocol;

Dynamically bond and pair available active components by establishing communication channel between the said slave and master components;

Dynamically determine which component is master or slave component or use statistically predefined configuration or master slave component relationship; and Exchange information and commands between master and slave components of the system;

Wherein the said master slave smart contact lens system further comprises:

At least one device comprising GPS sensor, configured to determine current location of device.

19. A master slave smart contact lens system comprising:

At least two devices where at least one device is arranged to operate as a master and the other as a slave;

At least one smart contact lens substrate with an embedded communication module, power supply module, wherein the said smart contact lens may be arranged as master or slave device;

At least one counter device, comprising at least an integrated communication module and power supply module wherein the said counter device may be arranged as a slave or a master;

At least one device comprises depth image capture component implemented as range finder at LIDAR or CCD or CMOS sensors or at least one image capture device implemented as CCD or CMOS sensor;

Wherein, the said depth image capture component is configured to produce depth image and the said image capture device is configured to produce photo image or video stream;

At least one processor module to analyze imagery.

20. A method of operating a master slave smart contact lens system,

Wherein a slave component is arranged to be at least one smart contact lens and a master component is arranged to be at least one smart contact lens or an off the eye device, further comprising the steps of:

Discovering active system components using predefined communication protocol;

Dynamically bond and pair available active components by establishing communication channel;

Dynamically determine which component is master or slave component or use statically predefined configuration of master slave component relationship; and Exchange information and commands between master and slave components of the system;

Wherein the said master slave smart contact lens system further comprises:

At least one device comprises depth image capture component implemented as range finder or LIDAR or CCD or CMOS sensors or at least one image capture device implemented as CCD or CMOS sensor;

Wherein, the said depth image capture component is configured to produce depth image and the said image capture device is configured to produce photo image or video stream; and At least one processor module to analyze imagery.

* * * * *